United States Patent
Olaker et al.

(10) Patent No.: US 6,549,562 B1
(45) Date of Patent: Apr. 15, 2003

(54) METHOD AND SYSTEM OF GENERATING A MODULATED CHIRP SIGNAL

(75) Inventors: David A. Olaker, Melbourne, FL (US); James C. Otto, Melbourne, FL (US); James R. Fillion, Sebastian, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/439,971

(22) Filed: Nov. 12, 1999

(51) Int. Cl.[7] ................................................. H04B 1/69
(52) U.S. Cl. ........................................ 375/139; 375/296
(58) Field of Search ................................. 375/139, 296, 375/302, 303, 308; 332/123, 126, 127

(56) References Cited

U.S. PATENT DOCUMENTS

| | | | |
|---|---|---|---|
| 4,613,976 A | 9/1986 | Sewerinson et al. | 375/52 |
| 5,093,636 A | 3/1992 | Higgins, Jr. et al. | 332/100 |
| 5,313,173 A | 5/1994 | Lampe | 332/103 |
| 5,325,075 A | 6/1994 | Rapeli | 332/103 |
| 5,424,688 A | 6/1995 | Phillips | 331/16 |
| 5,550,549 A * | 8/1996 | Procter et al. | 342/47 |
| 5,557,241 A * | 9/1996 | Burke | 331/4 |
| 5,719,584 A | 2/1998 | Otto | 342/465 |
| 5,859,613 A | 1/1999 | Otto | 342/463 |

* cited by examiner

*Primary Examiner*—Stephen Chin
*Assistant Examiner*—David B. Lugo
(74) *Attorney, Agent, or Firm*—Allen, Dyer, Doppelt, Milbrath & Gilchrist, P.A.

(57) ABSTRACT

A method and system generates a modulated chirp signal in accordance with the present invention. A phase-locked loop output signal is generated, together with a sampled feedback signal from a voltage controlled oscillator. The sampled feedback signal is received within a quadrature I/Q phase modulator. I/Q quadrature signals are generated from an I/Q generator circuit to the quadrature I/Q phase modulator to produce a desired modulation of a sampled feedback signal as a string of +/−90 degree phase shifts to create a desired offset at the voltage controlled oscillator. The I/Q quadrature signals are chirp modulated and the resultant phase-locked loop output signal is chirp modulated by the chirp signal that comprises a sequence of chirps having a reference chirp followed by a plurality of data chirps.

28 Claims, 3 Drawing Sheets

METHOD AND SYSTEM OF GENERATING A MODULATED CHIRP SIGNAL

FIELD OF THE INVENTION

This invention relates to the field of phase-locked loops, and more particularly, this invention relates to the field of phase-locked loops used in communication systems that incorporate a quadrature modulator.

BACKGROUND OF THE INVENTION

Chirp modulation and detection techniques are used in various devices and systems, such as tracking systems. One type of Wide Area Tracking and Location (WATL) transmitter system requires a low cost, reliable method of generating a "clean" four MHz chirp in the 900 MHz band. The resulting modulation technique could be used in a small, battery operated transmitter used for tracking people. An example of chirp modulation used in location determination is disclosed in commonly assigned U.S. Pat. No. 5,859,613 to Otto, the disclosure which is hereby incorporated by reference in its entirety.

In one proposed design, a read only memory (ROM) pattern generated a sequence of 90 degree phase shifts causing a linear FM modulation of 4 MHz over a full sequence of 8192 microseconds. Continuous −90 degree shifts occurred at 8 MHz and created a −2 MHz offset of the voltage controlled oscillator (VCO). The details of data encoding the chirps actually required going from less than −2 MHz, depending on data value, up to +2 MHz. One possible improvement of this design was to use a step phase accumulator in place of the ROM and implement this along with the sequencer in a small, high speed, programmable Application Specific Integrated Circuit (pASIC).

However, current FCC requirements are stringent on "out-of-band" spurs. This would result in requiring an expensive and custom SAW filter. Another expensive and possible approach would be to generate the chirps at intermediate frequencies (IF) using high speed digital signal processing (DSP) and then up-converting. In one approach, it was possible to generate a scaled down chirp and use it as a reference to the phase-locked loop (PLL) resulting in the VCO outputting the required chirp at the desired carrier. This approach would have the advantage of allowing the loop filter, already required, to reduce the out-of-and band modulation components. No costly filtering would be needed. However, it had the disadvantage of requiring generation of a very precise scaled down chirp. This would still require an expensive DSP engine.

U.S. Pat. No. 5,313,173 to Lampe discloses a phase-locked loop that incorporates a quadrature modulator for generating a constant envelope phase or frequency modulation. The system does provide for suppression of undesired amplitude modulation (AM) and phase modulation (PM) components of the modulated signal. However, chirp generation is desired in the Wide Area Tacking and Location system described above. These chirps would require data encoding and a reference, which cannot be provided by the quadrature modulated phase-locked loop system as disclosed in the '173 patent.

SUMMARY OF THE INVENTION

It is therefore an object of the present invention to provide a method of generating a modulated chirp signal that has data and reference, and can be used in a Wide Area Tracking and Location system, such as in a small, battery operated, transmitter.

The method, in accordance with the present invention, generates a modulated chirp signal and comprises the steps of generating a phase-locked loop output signal and sampled feedback signal from a voltage controlled oscillator. The method also comprises the step of receiving the sampled feedback signal within a quadrature I/Q phase modulator and generating I/Q quadrature signals from an I/Q generator circuit to produce a desired modulation of the sampled feedback signal as a string of +/−90 degrees phase shifts, creating a desired offset at the voltage controlled oscillator. The method also comprises the step of chirp modulating the I/Q quadrature signals and the resultant phase-locked loop output signal by a chirp signal comprising a sequence of chirps having a reference chirp followed by a plurality of data chirps.

In still another aspect of the present invention, each data chirp encodes a plurality of n-bits as an offset to a starting frequency. Each data chip can be correlated by two (Di+1) microseconds later than had it been a reference chirp.

In still another aspect of the present invention, the method comprises the step of data encoding the chirp from less than about −2 MHz to about +2 MHz. Out-of-band spurs can be reduced by a loop filter that receives signals from a phase detector. The step of generating the chirp signal can include the step of generating from a chirp controller. The frequency at the phase detector is about one MHz and the I/Q phase modulator output is about 907 MHz. The I/Q generator circuit comprises a programmable Application Specific Integrated Circuit (pASIC). The chirp signal can comprise a reference chirp followed by five data chirps.

A system of the present invention generates a modulated chirp signal and includes a phase-locked loop circuit comprising a voltage controlled oscillator, a phase detector, a quadrature I/Q phase modulator and a feedback loop for generating a phase-locked loop output signal from the voltage controlled oscillator and a sampled feedback signal from the voltage controlled oscillator to the quadrature I/Q phase modulator. An I/Q generator circuit is operatively connected to the quadrature I/Q phase modulator for generating I/Q quadrature signals to the quadrature I/Q phase modulator and producing a modulated signal as a string of +/−90 degrees phase shifts to create a desired offset at the voltage controlled oscillator. A chirp controller is connected to the I/Q generator circuit for generating a chirp signal to the I/Q generator circuit comprising a sequence of chirps having a reference chirp followed by a plurality of data chirps.

The chirp controller also data encodes the chirps from less than about −2 MHz to about +2 MHz. The loop filter reduces out-of-band spurs and the phase detector is about 1 MHz and the I/Q phase modulator is about 907 MHz.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention is advantageous because the system and method of the present invention not only has the advantage of placing the I/Q phase modulator in the feedback path of the loop, as taught by the '173 patent, but has the advantage of a loop filter to reduce the out-of-band modulation spurs. It also has the advantage of the chirp controller and I/Q generator circuit to generate the chirp that can be used in many different applications, including a Wide Area Tracking and Location system that uses a small transmitter for tracking purposes.

Figure 1:
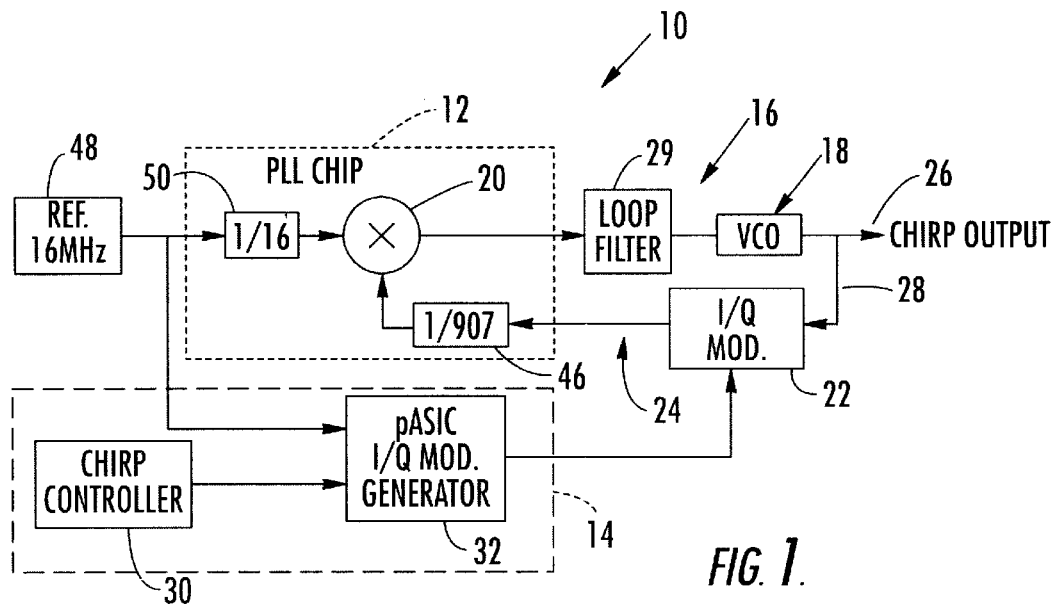
FIG. 1 is a schematic block diagram showing the system of the present invention that generates a modulated chirp signal.

The overall system 10 or circuit of the present invention is shown in FIG. 1, and major portions of the circuit can be included on one or more semiconductor chips, such as a phase-locked loop circuit contained on a semiconductor chip, as shown by the dotted outline at 12, and a chirp controller and I/Q generator circuit chip as shown by dotted outline at 14 corresponding to a chip. These semiconductor chips can be incorporated into one chip by manufacturing techniques known to those skilled in the art.

The system of the present invention includes a phase-locked loop circuit (with feedback) indicated at 16 that includes a voltage controlled oscillator (VCO) 18, a phase detector 20 and a quadrature I/Q phase modulator 22 in a feedback loop 24 for generating a phase-locked loop output signal 26 from the voltage controlled oscillator 18, and a sampled feedback signal 28 from the voltage controlled oscillator 18 to the quadrature I/Q phase modulator 22. A loop filter 29 is included.

Figure 4:
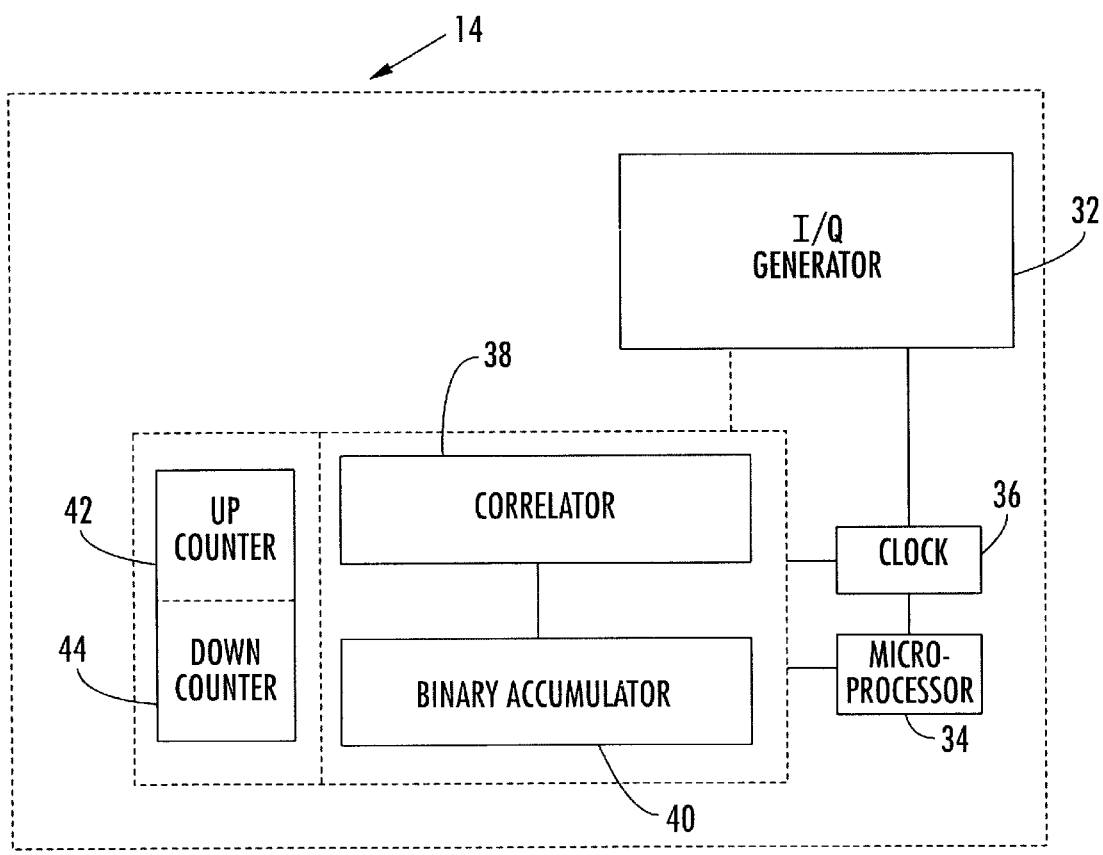
FIG. 4 is a schematic block diagram of the chirp controller and I/Q generator circuit of FIG. 1.

A chirp controller circuit 30 and I/Q generator circuit 32 (shown together by dotted line 14) are shown in greater detail in the schematic and functional block diagram of FIG. 4, and include a microprocessor 34, clock 36, correlator 38 and binary accumulator 40, and the appropriate up counters 42 and down counters 44, which will be explained in detail below. The output from the I/Q phase modulator 22 is input into a divider circuit 46, which in one aspect as an example, functions as a 1/907 divide down. A reference controller 48 generates a 16 MHz reference signal that is input not only through a 1/16 divider circuit 50, but also input into the I/Q generator circuit 32, as will be explained below. As an example, this allows the frequency at the phase detector 20 to be about 1 MHz and the I/Q phase modulator output 22 to be about 907 MHz. The I/Q generator circuit 32 can be manufactured in one aspect of the invention as a programmable Application Specific Integrated Circuit (pASIC).

A common requirement in signal processing equipment is to synthesize a complex modulation waveform with low spurious emissions. Mathematically, the waveform z(t), is given by the expression:

$$z(t) = (\sin \omega_c t)(\sin \theta i(t) + j \cos \theta q(t))$$

where $\omega_c$ denotes the carrier frequency and $\theta i$ and $\theta q$ denotes the instantaneous in-phase and quadrature phase modulation signals respectively. When $\theta i(t)$ and $\theta q(t)$ are chosen appropriately, the resulting z(t) could be a linear frequency modulated (FM) chirp waveform, a phase shift keyed (PSK) waveform, a quadrature phase shift keyed (QPSK) waveform, a minimal shift keyed (MSK) waveform, etc. Quite often, the signal to be generated can be represented by a discrete time series of samples.

The present invention can address the situations where the signal to be synthesized is a constant amplitude waveform. Notable examples of constant amplitude waveforms are direct pseudo-noise spread signals (PSK modulated) and linear FM signals (chirps). With constant amplitude signals, the exact waveform samples are given by:

$$z_k = A e^{j\theta k}$$

where A denotes an arbitrary constant and $\theta k$ denotes the phase associated with the $k_{th}$ sample. While $\theta k$ can take on any value between 0 and $2\pi$, the implementation becomes especially tenable when the waveform phase is restricted to take on one of four values (0, $\pi/2$, $\pi$, $3\pi/2$) consistent with QPSK modulation. Quantizing the waveform phase to four values has two important effects: it allows individual reference samples to be represented by only two bits, and it turns the multiplications into simple invert and/or multiplex operations.

As noted before, the I/Q phase modulator 22 is placed into the feedback path of the phase-locked loop. This has the advantage of using the loop filter 29 to reduce the out-of-band modulation spurs. However, the circuit and method of the present invention also eliminates the need to generate an extremely precise scaled down chirp.

In operation, based on control signals received from the chirp controller 30, the I/Q generator circuit 32, which in one preferred embodiment is formed as a programmable Application Specific Integrated Circuit (pASIC), outputs I, /I, Q and /Q to the I/Q phase modulator 22 to produce the desired modulation as a string of +/−90 degree phase shifts. This offsets the frequency coming out of the I/Q phase modulator 22 between about −2 MHz and +2 MHz. But to maintain lock, the VCO 18 is driven to compensate so that the chirp output remains at 907 MHz. Thus, a down chirp applied to the I/Q phase modulator 22 will cause the VCO 18 to up chirp, but smoothly because of the loop filter 29.

As a non-limiting example, the frequency at the phase detector 20 is 1 MHz. Relative to this frequency at the phase detector 20, the natural frequency of the loop was selected to be 20 kHz. This resulted in a capture range large enough to acquire quickly, but small enough to significantly reduce the MHz phase detector jitter. It was also felt that smoothing of the modulation spurs would be sufficient to meet the FCC, part 90 criteria. Pilot runs of a transmitter of the present invention appear to meet easily the FCC (90) requirements and the acquisition time is about three milliseconds from power up.

One other design adjustment in the present invention was to introduce a gentler ramp back between chirps, rather than an instantaneous flyback. This was accomplished to prevent phase slips and possible loss of lock at flyback. The design was implemented within the I/Q generator circuit 32 formed as a pASIC, together with the chirp controller 30. The design of this pASIC and associated chirp controller. Other examples of chirp generation are set forth in the incorporated by reference '613 patent.

Figure 2:
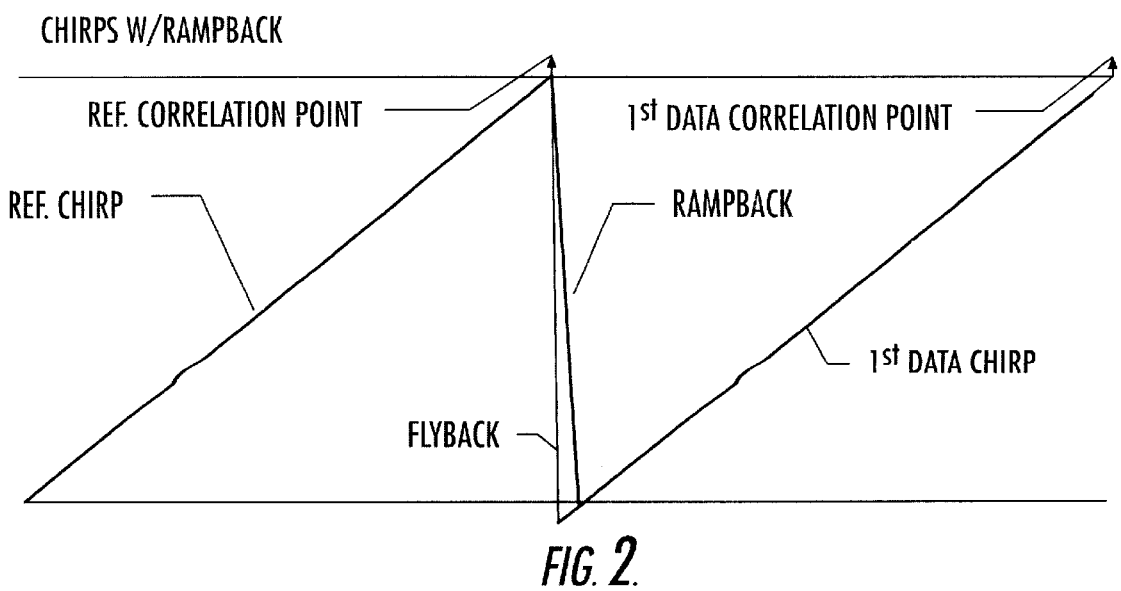
FIG. 2 is a graph showing the chirps with rampback that is selected to begin at the end of one chirp and last a defined period of time.

In one aspect of the present invention, the chirp signal is actually a sequence of six chirps with a reference chirp followed by five data chirps. Each data chirp encodes five bits as an offset to the starting frequency. At the correlator 38 in the receive processing chain, this will be detected as a time offset. Each data chirp correlation occurs 2(Di+1) microseconds later than had it been another reference chirp. The reference traverses 4 MHz in 8192 microseconds, hence a frequency offset of 976.5625 Hz results in a time lag of two microseconds. For example, if D1=31=11111, then D1+1= 32. The reference up chirp starts at Fc−2 MHz and chirps to Fc+2 MHz. The data chirp following would start at Fc−2 MHz−31250 Hz and chirp to Fc+2 MHz−31250 Hz. The rampback period is selected to begin at the end of one chirp and last 64 microseconds. This simplifies the hardware by eliminating the need to actually generate frequency offsets below −2 MHz, as shown in FIG. 2.

Figure 3:
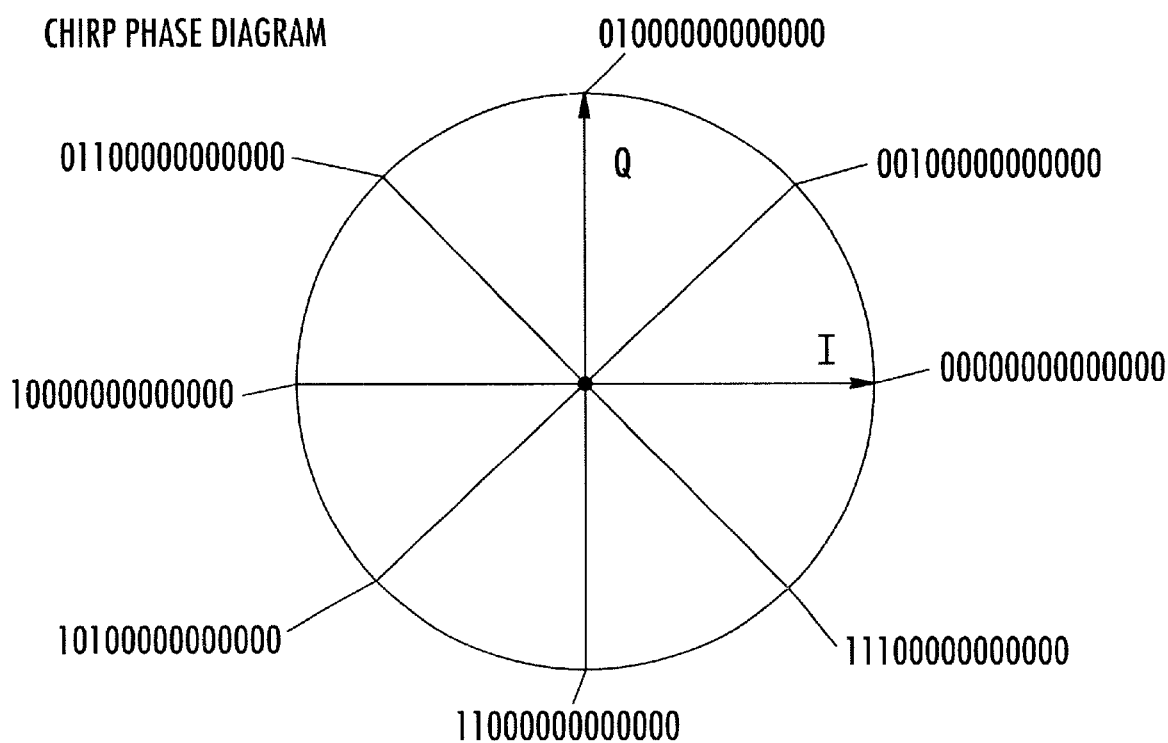
FIG. 3 is a graph showing the chirp phase diagram in one aspect of the present invention.

Because of grid limitations, the apparent size of the offset frequency and rampback period is exaggerated by about 5:1. The offset represented is 31.25 kHz and the rampback period is 64 microseconds. The individual chirp period is 8192 microseconds. The lower horizontal line represents an FM of −2 MHz, while the upper represents +2 MHz. The-phase associated with the FM chirp is called chirp phase. It is generated by a 14-bit binary accumulator 40. This divides the unit circle into phase steps of 360/2**14, as shown in FIG. 3.

The input to an accumulator represents frequency. Because the accumulator 40 is clocked at 16 MHz, the unit input "1" results in (1/214) cycles per (1/16) microseconds=976.5625 Hz. This is sufficient resolution to encode data. Any more is unneeded in this example. The input is a 12-bit number in 2's compliment. It may represent phase step values from −45 degrees to +45 degrees. A phase step of 45 degrees at a 16 MHz rate generates a 2 MHz phasor output from the accumulator 40. The phasor can be grey coded into values of 1 and −1 for I and Q so that the I/Q phase modulator 22** is stepped in 90 degree increments. This could be achieved with a clock of 8 MHz with accumulator phase steps up to 90 degrees. Another design could support 45 degree resolution on the I/Q phase modulator. This could be unnecessary.

The reference chirp is generated by running a 12-bit down counter 44 on a 0.5 MHz clock from 011111111111 to 100000000000. This linearly slews the phasor frequency from 2 MHz down to −2 MHz. The time taken is ((2**12)/0.5) microseconds, which is 8192 microseconds as desired. The next chirp to be sent is a data chirp. Except for rampback, it would begin on the next tick, at 011111111111+DV+1, where DV is the five bit data value from 0 to 31. After 32 more counts, 64 microseconds, the count would be 011111011111+DV+1, which is also 011111100000+DV.

What the rampback process does is linearly "walk" the counter from 100000000000 up to 011110000000 with 31 successive loads from an up-counter 42, and then to load it to 011111 (NEWDAT), where NEWDAT=1, DV for data, or 011111 to repeat another reference chirp. NEWDAT is a six bit word passed to the pASIC from a chirp microcontroller or processor that is part of the chirp controller 30. This value is held for one more count to total 33, exactly intersecting where the flyback situation would be, and then permitted to resume down counting to generate the data chirp.

This may continue as long as the chirp controller 30 continues to send data to the pASIC as part of the I/Q generator circuit 32. In this way, the chirp controller 30 may send any number of chirps in a sequence. The chirp controller 30 also has the ability to set a control bit in the pASIC 32, which interchanges I and Q resulting in an inversion of chirp direction. It is also possible to generate other forms of FM and PM modulation with the same basic hardware design with changes only to the pASIC and microcontroller firmware.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of generating a modulated chirp signal comprising the steps of:
   generating a phase-locked loop output signal and sampled feedback signal from a voltage controlled oscillator;
   receiving the sampled feedback signal within a quadrature I/Q phase modulator;
   generating I/Q quadrature signals from an I/Q generator circuit to the quadrature I/Q phase modulator and producing a desired modulation of the sampled feedback signal as a string of +/−90 degree phase shifts to create a desired offset at the voltage controlled oscillator; and
   chirp modulating the I/Q quadrature signals and the resultant phase-locked loop output signal by a chirp signal comprising a sequence of chirps having a reference chirp followed by plurality of data chirps.

2. A method according to claim 1, and further comprising the step of data encoding the chirps from less than about −2 MHz to about +2 MHz.

3. A method according to claim 1, and further comprising the step of reducing out-of-band spurs by a loop filter that receives signals from a phase detector.

4. A method according to claim 1, and further comprising the step of generating the chirp signal from a chirp controller.

5. A method according to claim 1, wherein the frequency at the phase detector is about one MHz and the I/Q phase modulator output is about 907 MHz.

6. A method according to claim 1, wherein the I/Q generator circuit comprises a programmable Application Specific Integrated Circuit (pASIC).

7. A method according to claim 1, wherein said chirp signal comprises a reference chirp followed by five data chirps.

8. A method of generating a modulated chirp signal comprising the steps of:
   generating a phase-locked loop output signal and sampled feedback signal from a voltage controlled oscillator;
   receiving the sampled feedback signal within a quadrature I/Q phase modulator;
   generating I/Q quadrature signals from an I/Q generator circuit to the quadrature I/Q phase modulator and producing a desired modulation of the sampled feedback signal as a string of +/−90 degree phase shifts to create a desired offset at the voltage controlled oscillator; and
   chirp modulating the I/Q quadrature signals and the resultant phase-locked loop output signal by a chirp signal comprising a sequence of chirps having a reference chirp followed by plurality of data chirps, wherein each data chirp encodes a plurality of n-bits as an offset to a starting frequency.

9. A method according to claim 8, and further comprising the step of correlating each data chirp by 2(Di+1) microseconds later than had it been a reference chirp.

10. A method according to claim 8, and further comprising the step of data encoding the chirps from less than about −2 MHz to about +2 MHz.

11. A method according to claim 8, and further comprising the step of reducing out-of-band spurs by a loop filter that receives signals from a phase detector.

12. A method according to claim 8, and further comprising the step of generating the chirp signal from a chirp controller.

13. A method according to claim 8, wherein the frequency at the phase detector is about one MHz and the I/Q phase modulator output is about 907 MHz.

14. A method according to claim 8, wherein the I/Q generator circuit comprises a programmable Application Specific Integrated Circuit (ASIC).

15. A method according to claim 8, wherein said chirp signal comprises a reference chirp followed by five data chirps.

16. A system for generating a modulated chirp signal comprising:

a phase-locked loop circuit comprising a voltage controlled oscillator, a phase detector, and a quadrature I/Q phase modulator in a feedback loop for generating a phase-locked loop output signal from the voltage controlled oscillator and a sampled feedback signal from the voltage controlled oscillator to the quadrature I/Q phase modulator;

an I/Q generator circuit operatively connected to said quadrature I/Q phase modulator for generating I/Q quadrature signals to the quadrature I/Q phase modulator and producing a modulation as a string of +/−90 degree phase shifts to create a desired offset at the voltage controlled oscillator; and a chirp controller connected to said I/Q generator circuit for generating a chirp signal to said I/Q generator circuit comprising a sequence of chirps having a reference chirp followed by a plurality of data chirps.

17. A system according to claim 16, wherein said chirp controller data encodes the chirps from less than about −2 MHz to about +2 MHz.

18. A system according to claim 16, and further comprising a loop filter for reducing out-of-band spurs.

19. A system according to claim 16, wherein the frequency at the phase detector is about one MHz and the I/Q phase modulator output is about 907 MHz.

20. A system according to claim 16, wherein the I/Q generator circuit comprises a programmable Application Specific Integrated Circuit (pASIC).

21. A system according to claim 16, wherein said chirp signal comprises a reference chirp followed by five data chirps.

22. A system for generating a modulated chirp signal comprising:

a phase-locked loop circuit comprising a voltage controlled oscillator, a phase detector, and a quadrature I/Q phase modulator in a feedback loop for generating a phase-locked loop output signal from the voltage controlled oscillator and a sampled feedback signal from the voltage controlled oscillator to the quadrature I/Q phase modulator;

an I/Q generator circuit operatively connected to said quadrature I/Q phase modulator for generating I/Q quadrature signals to the quadrature I/Q phase modulator and producing a modulation as a string of +/−90 degree phase shifts to create a desired offset at the voltage controlled oscillator; and a chirp controller connected to said I/Q generator circuit for generating a chirp signal to said I/Q generator circuit comprising a sequence of chirps having a reference chirp followed by a plurality of data chirps, wherein each data chirp encodes a plurality of n-bits as an offset to a starting frequency.

23. A system according to claim 22, and further comprising a correlator for correlating each data chirp by $2(D_i+1)$ microseconds later than had it been a reference chirp.

24. A system according to claim 22, wherein said chirp controller data encodes the chirps from less than about −2 MHz to about +2 MHz.

25. A system according to claim 22, and further comprising a loop filter for reducing out-of-band spurs.

26. A system according to claim 22, wherein the frequency at the phase detector is about one MHz and the I/Q phase modulator output is about 907 MHz.

27. A system according to claim 22, wherein the I/Q generator circuit comprises a programmable Application Specific Integrated Circuit (pASIC).

28. A system according to claim 22, wherein said chirp signal comprises a reference chirp followed by five data chirps.

* * * * *